United States Patent
Goyal

(10) Patent No.: US 10,764,186 B2
(45) Date of Patent: Sep. 1, 2020

(54) AUGMENTING FUNCTIONALITY IN DISTRIBUTED SYSTEMS WITH PAYLOAD HEADERS

(71) Applicant: salesforce.com, inc., San Francisco, CA (US)

(72) Inventor: Ankush Goyal, San Mateo, CA (US)

(73) Assignee: salesforce.com, inc., San Francisco, CA (US)

( * ) Notice: Subject to any disclaimer, the term of this patent is extended or adjusted under 35 U.S.C. 154(b) by 212 days.

(21) Appl. No.: 15/448,517

(22) Filed: Mar. 2, 2017

(65) Prior Publication Data
US 2018/0254962 A1 Sep. 6, 2018

(51) Int. Cl.
*H04L 12/801* (2013.01)
*H04L 29/06* (2006.01)
*H04L 12/24* (2006.01)
*H04L 12/26* (2006.01)
*H04L 29/08* (2006.01)

(52) U.S. Cl.
CPC .......... *H04L 47/12* (2013.01); *H04L 41/5009* (2013.01); *H04L 41/5064* (2013.01); *H04L 69/22* (2013.01); *H04L 43/10* (2013.01); *H04L 67/02* (2013.01)

(58) Field of Classification Search
None
See application file for complete search history.

(56) References Cited

U.S. PATENT DOCUMENTS

| | | | | |
|---|---|---|---|---|
| 9,450,849 | B1* | 9/2016 | Goldberg | H04L 43/0876 |
| 2004/0010570 | A1* | 1/2004 | Kaler | H04L 67/2804 |
| | | | | 709/220 |
| 2005/0278270 | A1* | 12/2005 | Carr | G06Q 10/10 |
| | | | | 706/25 |
| 2015/0269326 | A1* | 9/2015 | Weiner | G06F 16/273 |
| | | | | 705/3 |

OTHER PUBLICATIONS

Redko, Andriy. "Knowing how all your components work together: distributed tracing with Zipkin", Andriy Redko blog, Feb. 23, 2014 [retrieved on Dec. 10, 2018]. Retrieved from the Internet: <URL: http://aredko.blogspot.com/2014/02/knowing-how-all-your-components-work.html>. (Year: 2014).*

(Continued)

*Primary Examiner* — Kevin T Bates
*Assistant Examiner* — Dae Kim
(74) *Attorney, Agent, or Firm* — Holland & Hart LLP

(57) ABSTRACT

A method for data processing may include receiving a communication from a parent span, the communication including a data portion and a header portion. The header portion may include an identifier of an originating service that produced the communication, an identifier of a transaction for the communication, and an identifier of the parent span. The method may include identifying the parent span and the originating serviced based on the header portion. The method may also include performing a system trace process of the communication throughout the transaction based on the parent span and the originating service.

20 Claims, 9 Drawing Sheets

(56) References Cited

OTHER PUBLICATIONS

Shkuro, Yuri. "Evolving Distributed Tracing at Uber Engineering", Uber Engineering Blog, Feb. 2, 2017 [retrieved on Dec. 12, 2018]. Retrieved from the Internet: <URL: https://eng.uber.com/distributed-tracing/>. (Year: 2017).*

Neokleous, Giannis. "Distributed Tracing: Design and Architecture", Medium.com, Apr. 21, 2016 [retrieved on Sep. 28, 2019]. Retrieved from the Internet: <URL: https://medium.com/knerd/distributed-tracing-design-and-architecture-88b1ce31f60d>. (Year: 2016).*

Sigelman et al., "Dapper, a Large-Scale Distributed Systems Tracing Infrastructure."Google Technical Report, Apr. 2010, Google.

* cited by examiner

AUGMENTING FUNCTIONALITY IN DISTRIBUTED SYSTEMS WITH PAYLOAD HEADERS

FIELD OF TECHNOLOGY

The present disclosure relates generally to database systems and communication data processing, and more specifically to augmenting functionality in distributed systems with payload headers.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

The cloud platform may be configured as a distributed system. A distributed system may include multiple groups of machines performing various tasks in a coordinated fashion to process data flowing through the system. A distributed system may be configured to process large amounts of data (e.g., over a hundred million events per day). Due to the high volume of data and the large number of machines processing the data, it may be difficult to perform a diagnostic analysis on the system.

DETAILED DESCRIPTION

A distributed system may be used to process large amounts of data, and may include many machines (e.g., hundreds of thousands) configured to perform various processes on a piece of data (e.g., an email) as the data flows through the system. Diagnosing the performance of a distributed system may be difficult due to the complexity of the system architecture, the number of individual machines and processes, the high volume of data flowing through the system, or a combination of these factors. For example, if data is being lost within the system or is taking too long to propagate through the system, it may be difficult to determine which machines or processes are causing the problem.

In accordance with aspects of the present disclosure, a distributed system may be configured to wrap data with one or more headers as the data enters the system. These headers may be configured to provide diagnostic information regarding the performance of the system, such as temporal relationships and causal relationships indicating when and how the data propagates throughout the system (e.g., a tracing process). The headers may also be configured to facilitate real-time changes to the system to improve performance of the system (e.g., throttling). The headers may also provide security protocols for data to ensure the integrity of the data as it flows through the system. Examples of the types of headers that may be used include a parent service identifier header, a trace information header, header tags, a web token header, or a combination of these headers. The headers may facilitate these diagnostic, performance, and security functions without modifying the payload of the data. The headers may also be configured to add little or no additional processing load to the system.

Aspects of the disclosure are initially described in the context of an environment supporting distributed computing. An example of a distributed system configured to support augmenting functionality with payload headers is then described. Aspects of the disclosure are further illustrated by and described with reference to apparatus diagrams, system diagrams, and flowcharts that relate to augmenting functionality in distributed systems with payload headers.

Figure 1:
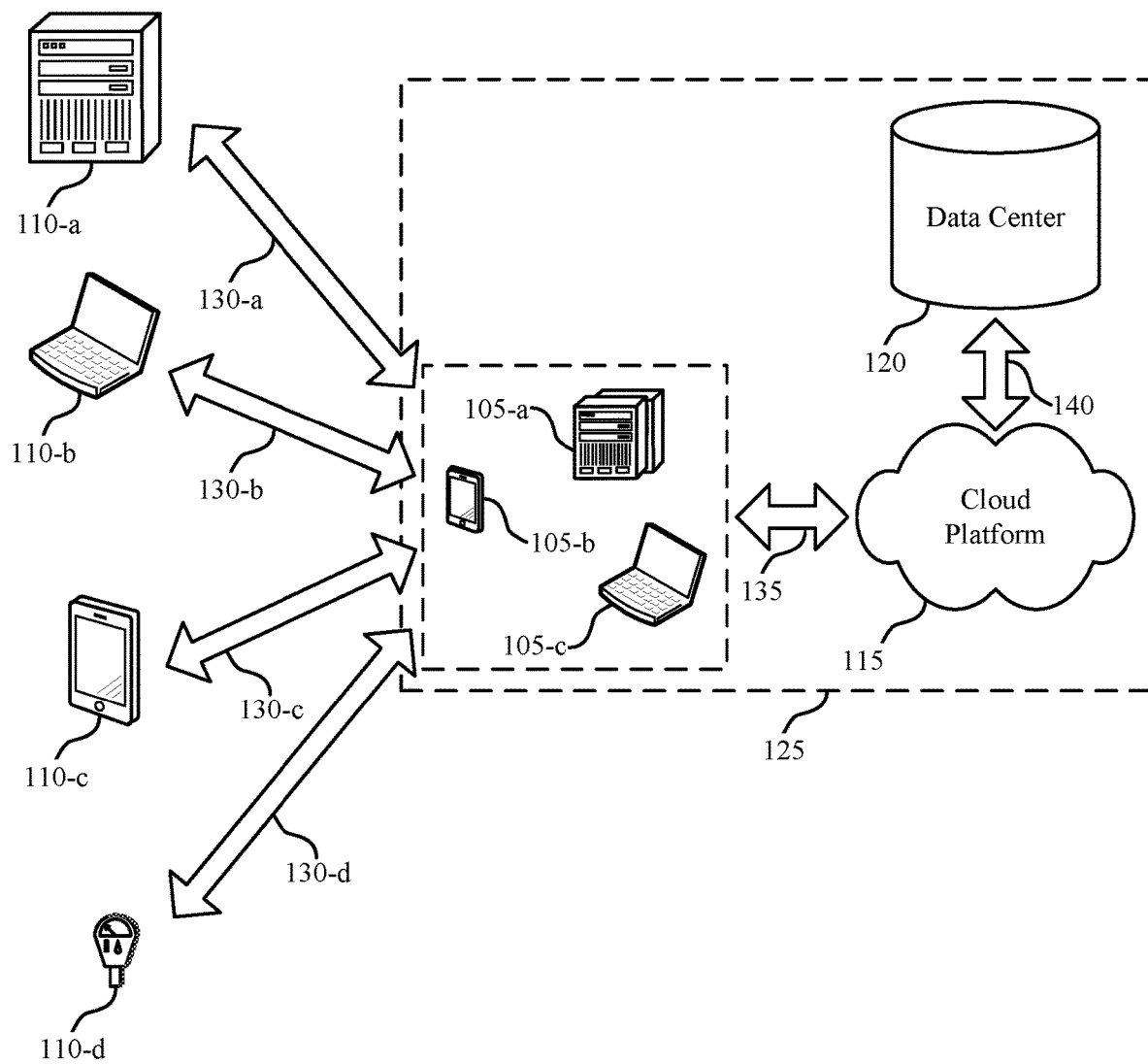
FIG. 1 illustrates an example of an environment for communication data processing that supports augmenting functionality in distributed systems with payload headers in accordance with aspects of the present disclosure.

FIG. 1 illustrates an example of an environment 100 for cloud computing that supports augmenting functionality in distributed systems with payload headers in accordance with various aspects of the present disclosure. The environment 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

System 125 may include cloud clients 105, cloud platform 115, and data center 120. In some cases, data processing may occur at any of the components of system 125, or at a combination of these components. In some cases, servers may perform the data processing. The servers may be a cloud client 105 or located at data center 120.

The system 125 may be an example of a distributed system configured to process large amounts of data. In accordance with aspects of the present disclosure, the system 125 may be configured to wrap data with one or more headers as the data enters the system 125. For example, an email from a contact 110 may be wrapped with one or more headers. As described in more detail below, the headers may facilitate diagnostic, performance, and security functions as the data propagates throughout the system 125.

Figure 2:
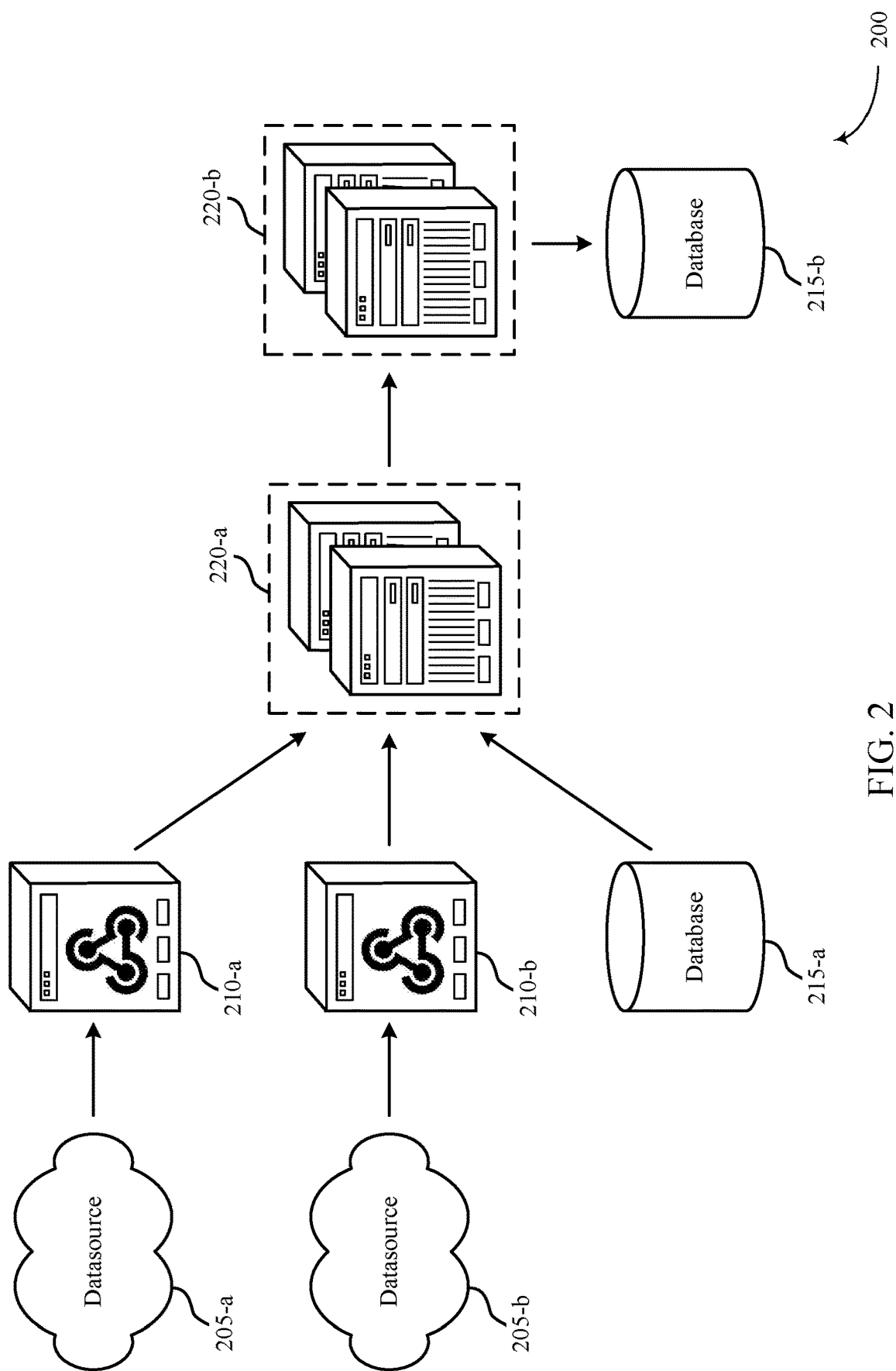
FIG. 2 illustrates an example of a system for communication data processing that supports augmenting functionality in distributed systems with payload headers in accordance with aspects of the present disclosure.

FIG. 2 illustrates an example of a system 200 for communication data processing that supports attaching headers to data to augment functionality in distributed systems in accordance with various aspects of the present disclosure. The system 200 may be an example of a distributed system, and may be an example of aspects of system 125, as described with respect to FIG. 1. The system 200 may include datasources 205, webhooks 210, databases 215, and spans 220. The components of system 200 are illustrated and described as an example in accordance with the present disclosure, and in some cases, the system 200 may include less or additional components than those pictured in FIG. 2. The system 200 may be configured to attach one or more headers to data as it enters the system 200 from a datasource 205 or a database 215. The headers may facilitate diagnostic, performance, and/or security functionality for the system 200.

A datasource 205 may be any type of server, system, or network that stores or generates data. For example, a datasource 205 may be an email server or database associated with a contact 110, as described with reference to FIG. 1. A webhook 210 may be a process or component configured to retrieve data (e.g., communication data) from a datasource 205 and pass it along to a span 220 for processing. For example, a datasource 205 may be configured to notify a webhook 210 that something has changed at the datasource 205 (e.g., new data was generated), and the webhook 210 may be configured to retrieve the new data. In some cases, a database 215 is configured to send data to a span 220 either in real time or in batches.

A span 220 may refer to a particular process or group or processes and/or the machine or group of machines that perform the process. For example, span 220-a may perform a first process on some data (e.g., extract contact information from the data), and span 220-b may perform a second process on the data (e.g., perform natural language processing on the data). Each span 220 may include one or more devices (e.g., computers, servers, databases or any components of system 125 described with reference to FIG. 1) configured to cooperatively process data passing through the span 220. After data is processed by the spans 220, it may be sent to database 215-b for storage or to some other downstream system, process, or component. A transaction may refer to the complete cycle of propagating and processing a particular piece of data through the system 200.

A piece of data (e.g., a communication) may include a data portion (e.g., the data payload) and a header portion. For example, the data may be an email generated at datasource 205-a. In this example, the data portion may include the body of the email, the addresses associated with the email, and/or metadata associated with the email, and the header portion may include one or more headers attached to the data portion by the system 200. In some cases, the webhook 210-a or the span 220-a may wrap the payload with one or more headers (e.g., associate the payload with one or more headers). In other cases, some other component of system 200 may wrap the payload with one or more headers. In another example, database 215-a may send data to span 220-a for processing. In this case, database 215-a or span 220-a may wrap the data portion with one or more headers. The one or more headers may include a parent service header, a trace information header (which may include a transaction identifier header, a parent span identifier header, and a sampling header), a tags header, and a web token header. The system 200 may wrap a data payload with any combination of these headers.

After webhook 210-*a* retrieves some data from datasource 205-*a*, the span 220-*a* may receive the data, including the data portion and the header portion. Span 220-*a* may unwrap (e.g., process) the headers from the payload and process the data portion of the data in accordance with the process associated with the span 220-*a*. The headers attached to the payload may not affect the processing of the data portion (e.g., by not adding processing time to the normal process associated with span 220-*a*). The span 220-*a* may store information from the headers locally (e.g., in a log), which the system 200 may later use to perform various diagnostic processes (e.g., tracing).

The header portion may include identification information to facilitate tracking the payload throughout the system. For example, the header portion may include a parent service header, which may identify the originating service of the payload. Datasource 205-*a* may be the originating service for a particular payload, and datasource 205-*b* may be the originating service for a different payload. The parent service may also be referred to as the root service for a piece of data. In some examples, webhook 210-*a* and webhook 210-*b* (or some other component of system 200) may attach parent service headers to the data that uniquely identify the corresponding parent or root service.

The header portion may also include a transaction identifier header. The transaction identifier header may uniquely identify the transaction associated with a particular data payload. The header portion may also include a parent span identifier header. The parent span identifier header may identify the immediately-preceding span 220 that the payload was processed by. For example, in system 200, span 220-*a* would be the parent span for data with respect to span 220-*b* if data is transmitted directly from span 220-*a* to span 220-*b*.

The header portion may also include a sampling header. The sampling header may indicate whether tracing for a particular piece of data should be performed. The sampling header may include a single bit that can be toggled to indicate that tracing is on or off. The system 200 may be configurable to selectively or randomly toggle tracing for a certain percentage of data payloads flowing through the system 200. The combination of the transaction identifier header, the parent span identifier header, and the sampling header may be included in a combination header referred to as a trace information header.

The one or more headers of the trace information header may facilitate performing a trace process for system 200. In general, a system trace process may analyze how long it takes for a data payload to flow through the system 200, and how long the data was at each location or process within the system 200. A system trace process may also determine a path a data payload takes throughout a transaction (e.g., which spans 220 the data was processed by and in which order). For example, the payload may be sent from span 220-*a* to span 220-*b*, and then to database 215-*b*, which may be referred to as the path of the payload throughout the transaction.

Additionally or alternatively, one or more headers in the header portion may facilitate real-time performance adjustments to the system 200, such as throttling. For example, datasource 205-*b* may be transmitting a disproportionate amount of data (e.g., above a predetermined threshold) to span 220-*a*, which may consume a disproportionate amount of resources (e.g., bandwidth) and degrade system performance (e.g., by slowing down data flow from datasource 205-*a* or database 215-*a*). System 200 may be able to identify that datasource 205-*b* is causing the issue based at least on the parent service header. To more efficiently process the data from datasource 205-*a* and database 215-*a*, span 220-*a* (or some other component of system 200) may throttle the data originating from datasource 205-*b*. In some cases, throttling may include stopping all payloads sent from datasource 205-*b* to span 220-*a*. In other cases, throttling may include limiting the number of payloads received from datasource 205-*b* at span 220-*a* for a predetermined amount of time. The throttling may result in improved processing efficiency at span 220-*a* and improved performance of the system 200.

Additionally or alternatively, one or more headers in the header portion may facilitate security measures for particular data payloads flowing through system 200. For example a component of system 200 may attach a web token header to the header portion of a data payload. The web token header may specify certain security protocols associated with the payload, which may help ensure the integrity of the data payload as it is processed by system 200.

In one example, datasource 205-*a* may receive a new email. Datasource 205-*a* may notify webhook 210-*a* of the email, and the webhook 210-*a* may retrieve the new email and transmit it to span 220-*a*. Span 220-*a* (or some other component of system 200 such as webhook 210-*a*) may attach headers to the data corresponding to the email. For example, span 220-*a* may attach a parent service header indicating the data corresponding to the email originated at datasource 205-*a*. Span 220-*a* may also attach a transaction identifier header, uniquely identifying the transaction associated with the new email entering the system 200.

Span 220-*a* may process the data corresponding to the email. For example, at span 220-*a*, a server may perform natural language processing on the email to identify important events that occurred in the email. Span 220-*a* may then unwrap or otherwise process any headers associated with the email (e.g., any headers added by a previous component). For example, span 220-*a* may record a parent service identifier header, a transaction identifier header, and/or a timestamp in local memory. As discussed below, this header information along with the timestamp information may be used to perform diagnostic analysis on the system 200. Span 220-*a* may modify or add a parent span identifier header to identify span 220-*a* as the parent span, and may then send the payload to span 220-*b* for further processing. Span 220-*b* may perform further processing on the data portion of the email, for example identifying a particular client associated with the email. Span 220-*b* may then unwrap or otherwise process any headers associated with the email similar to the header processing that occurred at span 220-*a*. Span 220-*b* may then modify the parent span identifier header to identify span 220-*b* as the new parent span, and may send the payload to database 215-*b* for storage or further processing.

A system trace process may be performed to track the processing of the email throughout the system 200. For example, the system trace process may determine the amount of time that the server takes to process the data corresponding to the email at span 220-*a* (e.g., by analyze the timestamps associated with the processing at span 220-*a*). The system trace process may track the path and travel time of the payload from span 220-*a* to span 220-*b* (e.g., by analyzing the parent span identifier headers and timestamps at each span 220-*a* and span 220-*b*). The system trace process may track the amount of time span 220-*b* processed the payload and the path from span 220-*b* to database 215-*b* (e.g., by analyzing the parent span identifier headers and timestamps at each of span 220-*b* and database 215-*b*).

In some cases, the system 200 may generate a graphical representation of the system trace process. For example, the system 200 may generate and display a call graph to the user. The call graph may indicate the path of the payload from webhook 210-*a* to span 220-*a*, to span 220-*b*, to database 215-*b*. The call graph may also indicate the amount of time the payload spent at each span 220 for processing. In some cases, the user may select to throttle payloads from a specific originating service or span 220 based on the system trace process displayed in the call graph. In other cases, a span 220 may automatically throttle payloads based on processing times or bandwidth usage exceeding a predetermined threshold.

Figure 3:
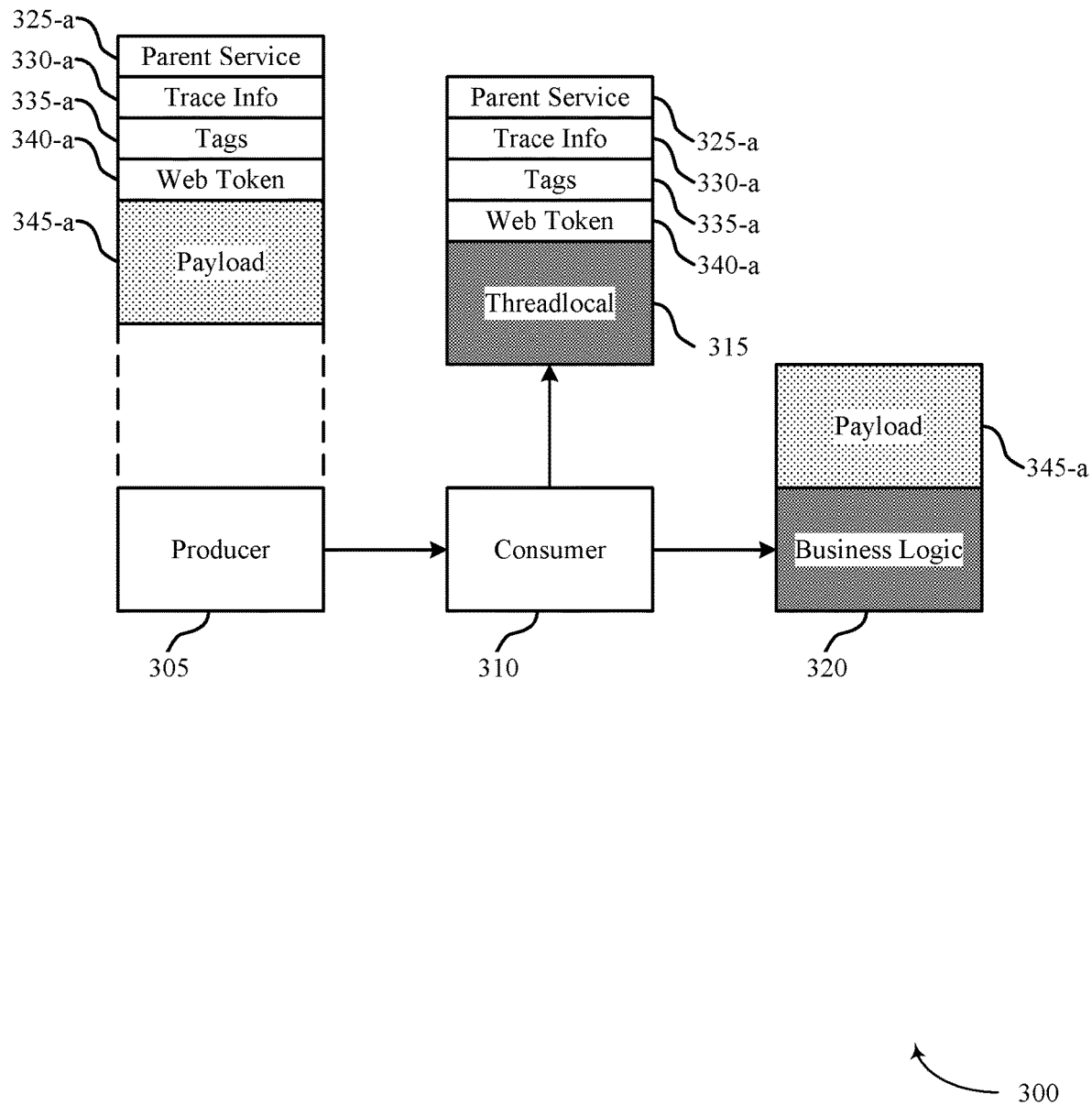
FIG. 3 illustrates an example of a transaction that supports augmenting functionality in distributed systems with payload headers in accordance with aspects of the present disclosure.

FIG. 3 illustrates an example of a transaction 300 that supports adding headers to a data payload to augment functionality in distributed systems in accordance with various aspects of the present disclosure. The transaction 300 may include a producer 305 sending data to a consumer 310 for processing. The consumer 310 may be an example of a span 220 or any other component or system that receives and processes data, as described with reference to FIG. 2. The producer 305 may be an example of a datasource 205, a webhook 210, a database 215, a span 220 or any other component or system that generates or transmits data, as described with reference to FIG. 2. In some cases, a producer 305 may be implemented in a server or a user device or any component of system 125 described with reference to FIG. 1.

In a distributed system, a producer 305 may attach one or more headers to the data portion of a piece of data (e.g., payload 345-*a*) to facilitate diagnostic, performance, and/or security functionality for the distributed system. Attaching the one or more headers may also be referred to as wrapping the data payload with headers. In some cases, payload 345-*a* may be an example of a communication (e.g., an email). Attaching the one or more headers may be an augmented function of an existing mechanism for communication. For example, attaching the one or more headers may be implemented using a modified library of functions of an Apache Kafka protocol or an http protocol.

The one or more headers may include a parent service identifier header 325-*a*, a trace info header 330-*a* (which may include a transaction identifier header, a parent span identifier header, a sampling identifier header or any combination of these headers), one or more header tags 335-*a*, and a web token header 340-*a*. The combination of the one or more headers may be referred to as the header portion of a particular piece of data.

Parent service identifier header 325-*a* may indicate a service that produced payload 345-*a*. Each originating or root service may be represented by a globally unique parent service identifier. The transaction identifier header may indicate the particular transaction 300 that payload 345-*a* is part of. Each particular transaction 300 may have a globally unique transaction identifier. The parent span identifier header may indicate the previous span that interacted with the payload 345-*a*. Each span may have a unique parent span identifier. The sampling identifier header may indicate whether a tracing process is toggled on or off for that particular payload 345-*a*. For example, the sampling identifier header may be represented as a Boolean such that one value of the Boolean indicates to the consumer 310 to perform tracing, while another value of the Boolean indicates to the consumer 310 not to perform tracing (or storage or processing of headers to facilitate tracing).

In some cases, the producer 305 may attach header tags 335-*a* to specify additional functionality for the consumer 310 to perform on payload 345-*a*. In some cases, there may be a maximum number of header tags 335-*a* that can be attached to payload 345-*a*. In other cases, unlimited header tags 335-*a* may be attached to payload 345-*a*. A header tag 335-*a* may be an example of a data string. The header tag 335-*a* may specify additional functions for the consumer 310 to perform on the header or on payload 345-*a*. For example, the consumer 310 may modify a system trace process of payload 345-*a* based on the header tags 335-*a*. In some cases, the consumer 310 may store a repository of tags, mapping the string to a function. For example, a header tag 335-*a* may be an audit tag. The audit tag may be attached to a test payload 345 in order to test how the distributed system is performing. The producer 305 may periodically create a test payload 345 with an audit tag. The consumer 310 may record the tracing of the test payload 345, so that a user may observe the behavior of the distributed system. In some cases, a user may specify additional header tags 335-*a* and corresponding functionality.

In some cases, the producer 305 may attach a web token header 340-*a* to increase security of payload 345-*a*. In some cases, the web token header 340-*a* may be an example of a JavaScript object notation (JSON) web token header. The web token header 340-*a* may indicate an owner of the data, information associated with the owner, and a data policy of the owner. The consumer 310 may identify functions that may be performed on payload 345-*a* based on the data policy of the owner. The web token header 340-*a* may include a signature of the owner. If payload 345-*a* is altered in the transaction after the signature of the owner, the header may include an indication that payload 345-*a* contains an unauthorized alteration. The consumer 310 may identify the unauthorized alteration, and may determine whether to process payload 345-*a* or alert a user.

A consumer 310 may receive payload 345-*a* from the producer 305, along with any attached headers. The consumer 310 may include business logic 320 that processes the payload 345-*a* as normal (e.g., natural language processing on an email). In some cases, business logic 320 may ignore the one or more headers when performing operations on payload 345-*a*. In other cases, business logic 320 may perform operations on payload 345-*a* based on the one or more headers. Attaching the one or more headers may not alter the data or processing of the data for payload 345-*a*.

The consumer 310 may store information from one or more headers within thread-local data 315 of a span (or some other local storage method, such as a log). For example, the consumer 310 may identify and store an indication of a parent span and an originating service for payload 345-*a* based on the one or more headers. The consumer 310 may also store one or more timestamps indicating when the payload 345-*a* arrived at the consumer 310 and/or when the payload 345-*a* left the consumer 310. The one or more headers and timestamps may facilitate tracking temporal or causal relationships within a transaction 300 based on a system trace process of payload 345-*a*.

The consumer 310 may perform throttling based on the distributed tracing. For example, the consumer 310 may identify a particular process or span that is using a large amount of time or resources based on the parent span identifier header. The consumer 310 may throttle the data from that span to reduce backup or overhead for the system.

Figure 4:
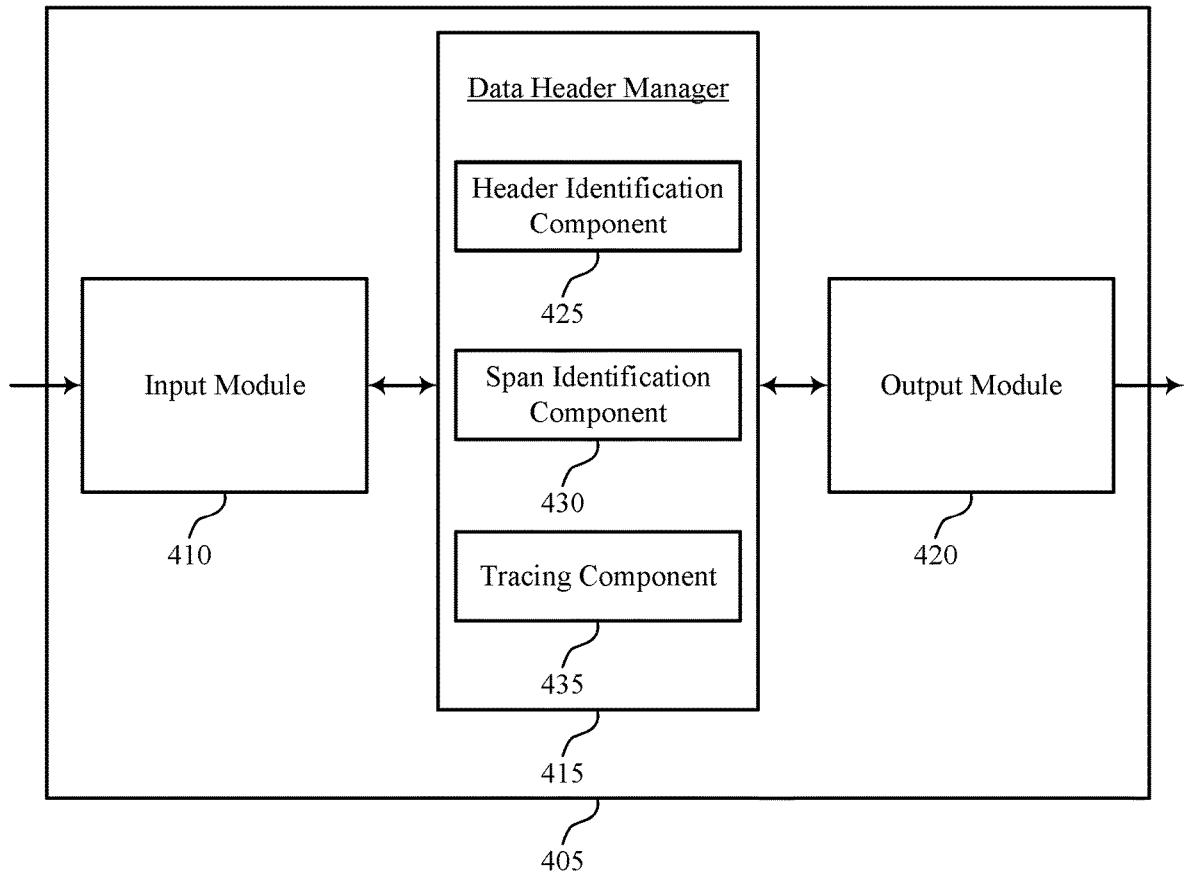
FIG. 4 shows a block diagram of a system that supports augmenting functionality in distributed systems with payload headers in accordance with aspects of the present disclosure.

FIG. 4 shows a block diagram 400 of a system 405 that supports augmenting functionality in distributed systems with payload headers in accordance with various aspects of the present disclosure. System 405 may include input module 410, data header manager 415, and output module 420. System 405 may also include a processor. Each of these components may be in communication with one another (e.g., via one or more buses). In some cases, system 405 may be an example of a user terminal, a database server, or a system containing multiple computing devices. Data header manager 415 may be an example of aspects of the data header manager 615 described with reference to FIG. 6. Data header manager 415 may also include header identification component 425, span identification component 430, and tracing component 435.

Data header manager 415 and/or at least some of its various sub-components may be implemented in hardware, software executed by a processor, firmware, or any combination thereof. If implemented in software executed by a processor, the functions of the data header manager 415 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The data header manager 415 and/or at least some of its various sub-components may be physically located at various positions, including being distributed such that portions of functions are implemented at different physical locations by one or more physical devices. In some examples, data header manager 415 and/or at least some of its various sub-components may be a separate and distinct component in accordance with various aspects of the present disclosure. In other examples, data header manager 415 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Header identification component 425 may receive a communication from a parent span, the communication including a data portion and a header portion, where the header portion includes an identifier of an originating service that produced the communication, an identifier of a transaction for the communication, and an identifier of the parent span. In some cases, the header portion further includes a sampling header, where the sampling header indicates whether to perform the system trace process. In some cases, the header portion further includes one or more tags. In some cases, the header portion further includes an identifier of an owner of the communication, information corresponding to the owner, a data policy of the communication, or a combination thereof.

Span identification component 430 may identify the parent span and the originating service based on the header portion. Tracing component 435 may perform a system trace process of the communication throughout the transaction based on the parent span and the originating service and may display a graphical representation of the set of spans associated with the communication throughout the transaction. In some cases, the performing the system trace process includes identifying a set of spans associated with the communication throughout the transaction. In some cases, the performing the system trace process includes identifying a temporal relationship between the communication and the set of spans associated with the communication throughout the transaction. In some cases, the performing the system trace process is based on the one or more tags.

Figure 5:
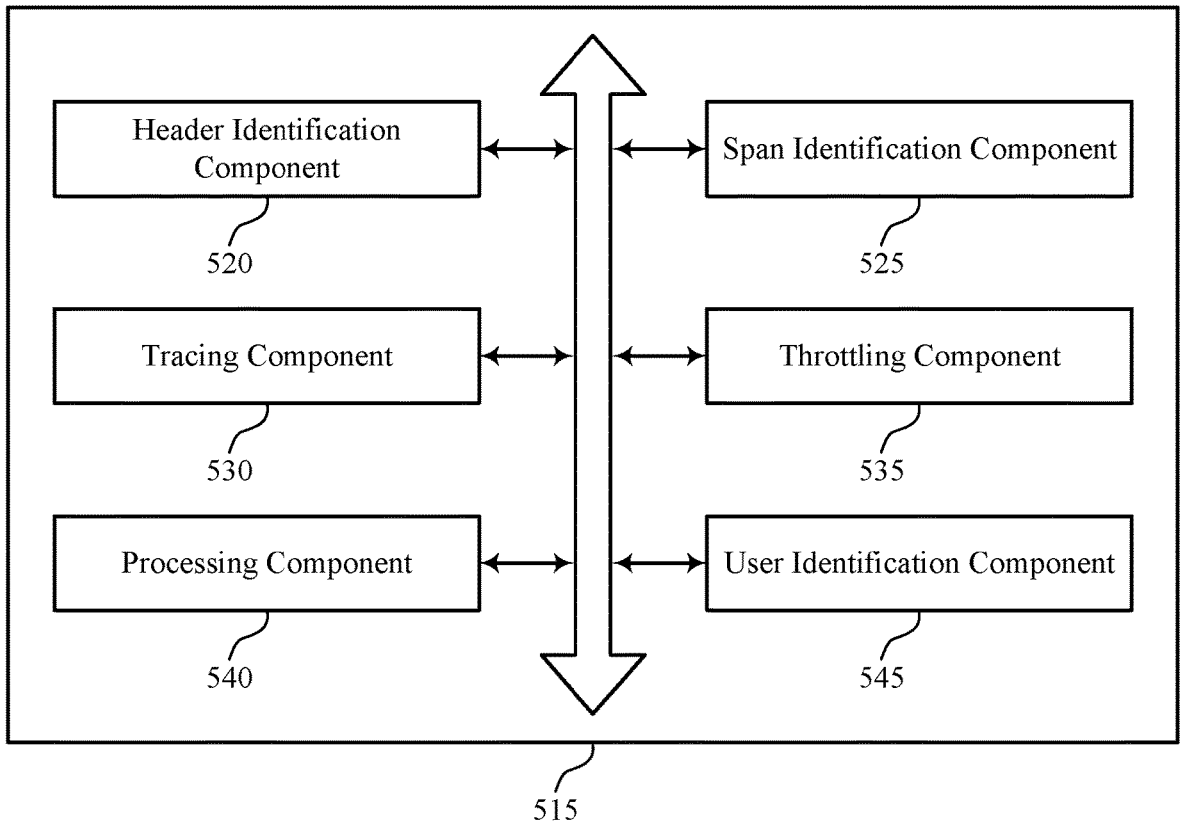
FIG. 5 shows a block diagram of a data header manager that supports augmenting functionality in distributed systems with payload headers in accordance with aspects of the present disclosure.

FIG. 5 shows a block diagram 500 of a data header manager 515 that supports augmenting functionality in distributed systems with payload headers in accordance with various aspects of the present disclosure. The data header manager 515 may be an example of aspects of a data header manager 415 or 615 described with reference to FIGS. 4 and 6. The data header manager 515 may include header identification component 520, span identification component 525, tracing component 530, throttling component 535, processing component 540, and user identification component 545. Each of these modules may communicate, directly or indirectly, with one another (e.g., via one or more buses).

Header identification component 520 may receive a communication from a parent span, the communication including a data portion and a header portion, where the header portion includes an identifier of an originating service that produced the communication, an identifier of a transaction for the communication, and an identifier of the parent span. In some cases, the header portion further includes a sampling header, where the sampling header indicates whether to perform the system trace process. In some cases, the header portion further includes one or more tags. In some cases, the header portion further includes an identifier of an owner of the communication, information corresponding to the owner, a data policy of the communication, or a combination thereof.

Span identification component 525 may identify the parent span and the originating service based on the header portion. Tracing component 530 may perform a system trace process of the communication throughout the transaction based on the parent span and the originating service and display a graphical representation of the set of spans associated with the communication throughout the transaction. In some cases, the performing the system trace process includes identifying a set of spans associated with the communication throughout the transaction. In some cases, the performing the system trace process includes identifying a temporal relationship between the communication and the set of spans associated with the communication throughout the transaction. In some cases, the performing the system trace process is based on the one or more tags.

Throttling component 535 may throttle communications from the parent span based on the system trace process. Processing component 540 may perform an additional process based on the one or more tags. User identification component 545 may identify a modification to the communication by a user other than the owner of the communication and flag the communication with an indication that the modification was by a user other than the owner of the communication.

Figure 6:
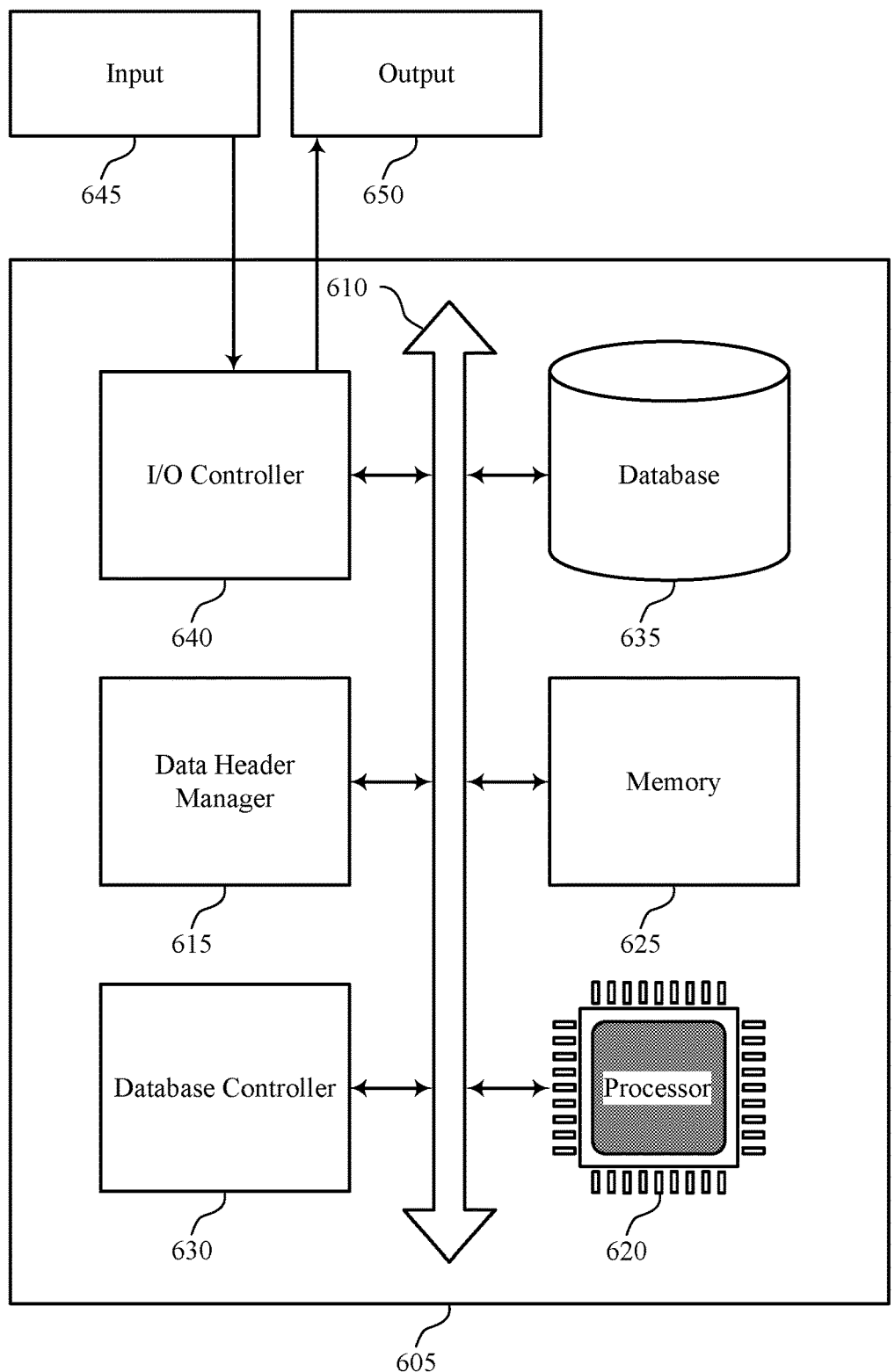
FIG. 6 illustrates a block diagram of an environment including a data header manager that supports augmenting functionality in distributed systems with payload headers in accordance with aspects of the present disclosure.

FIG. 6 shows a diagram of an environment 600 including a system 605 that supports augmenting functionality in distributed systems with payload headers in accordance with various aspects of the present disclosure. System 605 may be an example of or include the components of system 125 as described above, e.g., with reference to FIG. 1. System 605 may include components for bi-directional data communications including components for transmitting and receiving communications, including data header manager 615, processor 620, memory 625, database controller 630, database 635, and I/O controller 640. The functionality of the above components may be performed at separate servers, user devices, or databases in system 605, or may be performed by different components of one or more same servers, user devices, or databases. These components may be in electronic communication via one or more busses (e.g., bus 610).

Processor 620 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 620 may be configured to operate a memory array using a memory controller. In other cases, a memory controller may be integrated into processor 620. Processor 620 may be configured to execute computer-readable instructions stored in a memory to perform various functions (e.g., functions or tasks supporting augmenting functionality in distributed systems with payload headers).

Memory 625 may include random access memory (RAM) and read only memory (ROM). The memory 625 may store computer-readable, computer-executable software 630 including instructions that, when executed, cause the processor to perform various functions described herein. In some cases, the memory 625 may contain, among other things, a basic input/output system (BIOS) which may control basic hardware and/or software operation such as the interaction with peripheral components or devices.

Database controller 630 may manage data storage and processing in database 635. In some cases, a user may interact with database controller 630. In other cases, database controller 630 may operate automatically without user interaction. Database 635 may be an example of a single database, a distributed database, multiple distributed databases, or an emergency backup database.

I/O controller 640 may manage input and output signals for device 605. I/O controller 640 may also manage peripherals not integrated into device 605. In some cases, I/O controller 640 may represent a physical connection or port to an external peripheral. In some cases, I/O controller 640 may utilize an operating system such as iOS®, ANDROID®, MS-DOS®, MS-WINDOWS®, OS/2®, UNIX®, LINUX®, or another known operating system. In other cases, I/O controller 640 may represent or interact with a modem, a keyboard, a mouse, a touchscreen, or a similar device. In some cases, I/O controller 640 may be implemented as part of a processor. In some cases, a user may interact with device 605 via I/O controller 640 or via hardware components controlled by I/O controller 640.

Figure 7:
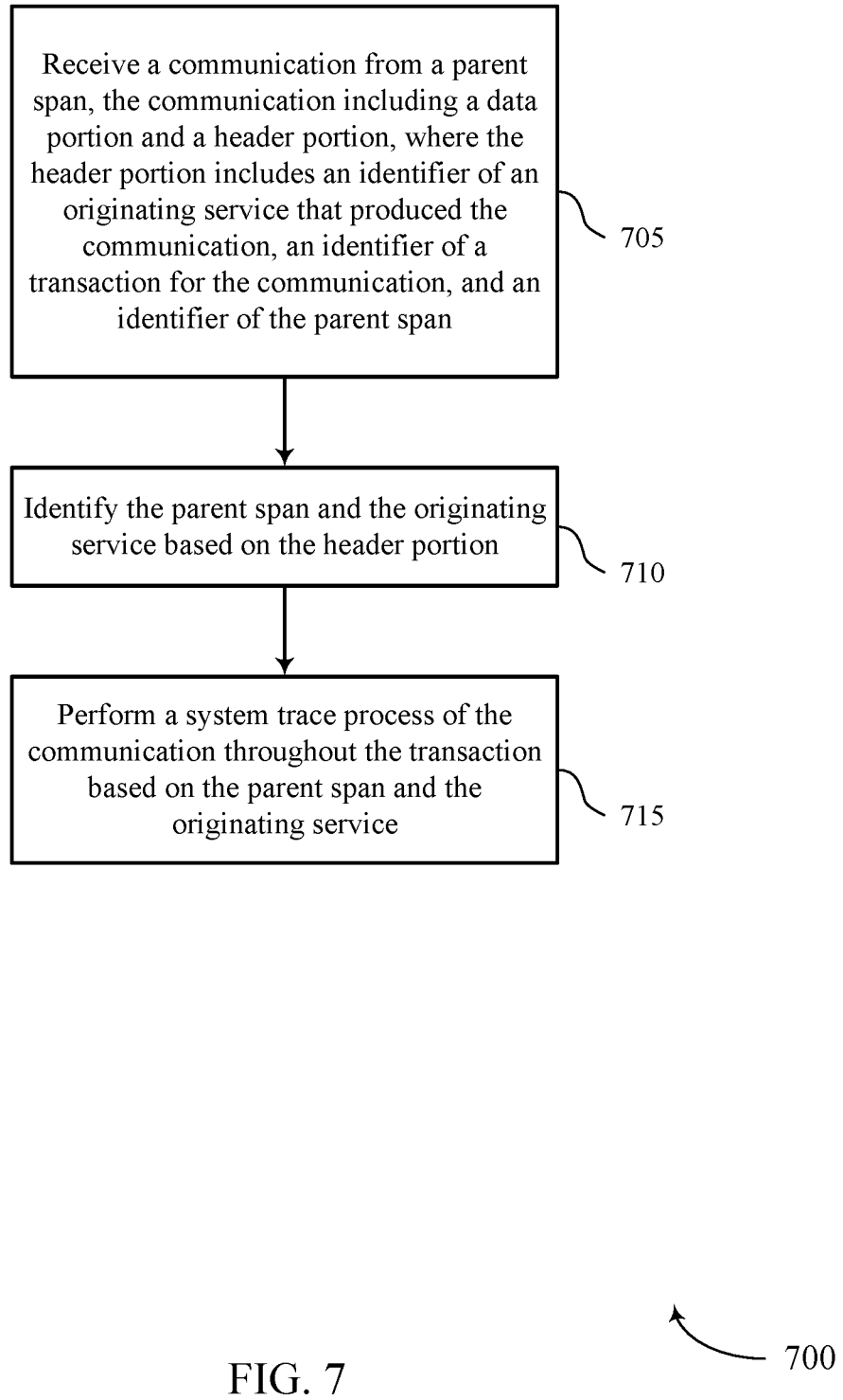
FIGS. 7 through 9 illustrate methods for augmenting functionality in distributed systems with payload headers in accordance with aspects of the present disclosure.

FIG. 7 shows a flowchart illustrating a method 700 for augmenting functionality in distributed systems with payload headers in accordance with various aspects of the present disclosure. The operations of method 700 may be implemented by a data header manager or its components as described herein. For example, the operations of method 700 may be performed by a data header manager 415, 515, or 615 as described with reference to FIGS. 4 through 6. In some examples, a data header manager may execute a set of codes to control the functional elements of the device to perform the functions described below. Additionally or alternatively, the data header manager may perform aspects of the functions described below using special-purpose hardware.

At block 705 the data header manager 415, 515, or 615 may receive a communication from a parent span, the communication comprising a data portion and a header portion, wherein the header portion comprises an identifier of an originating service that produced the communication, an identifier of a transaction for the communication, and an identifier of the parent span. The operations of block 705 may be performed according to the methods described with reference to FIGS. 1 through 3. In certain examples, aspects of the operations of block 705 may be performed by a header identification component as described with reference to FIGS. 4 through 6.

At block 710 the data header manager 415, 515, or 615 may identify the parent span and the originating service based at least in part on the header portion. The operations of block 710 may be performed according to the methods described with reference to FIGS. 1 through 3. In certain examples, aspects of the operations of block 710 may be performed by a span identification component as described with reference to FIGS. 4 through 6.

At block 715 the data header manager 415, 515, or 615 may perform a system trace process of the communication throughout the transaction based at least in part on the parent span and the originating service. The operations of block 715 may be performed according to the methods described with reference to FIGS. 1 through 3. In certain examples, aspects of the operations of block 715 may be performed by a tracing component as described with reference to FIGS. 4 through 6.

Figure 8:
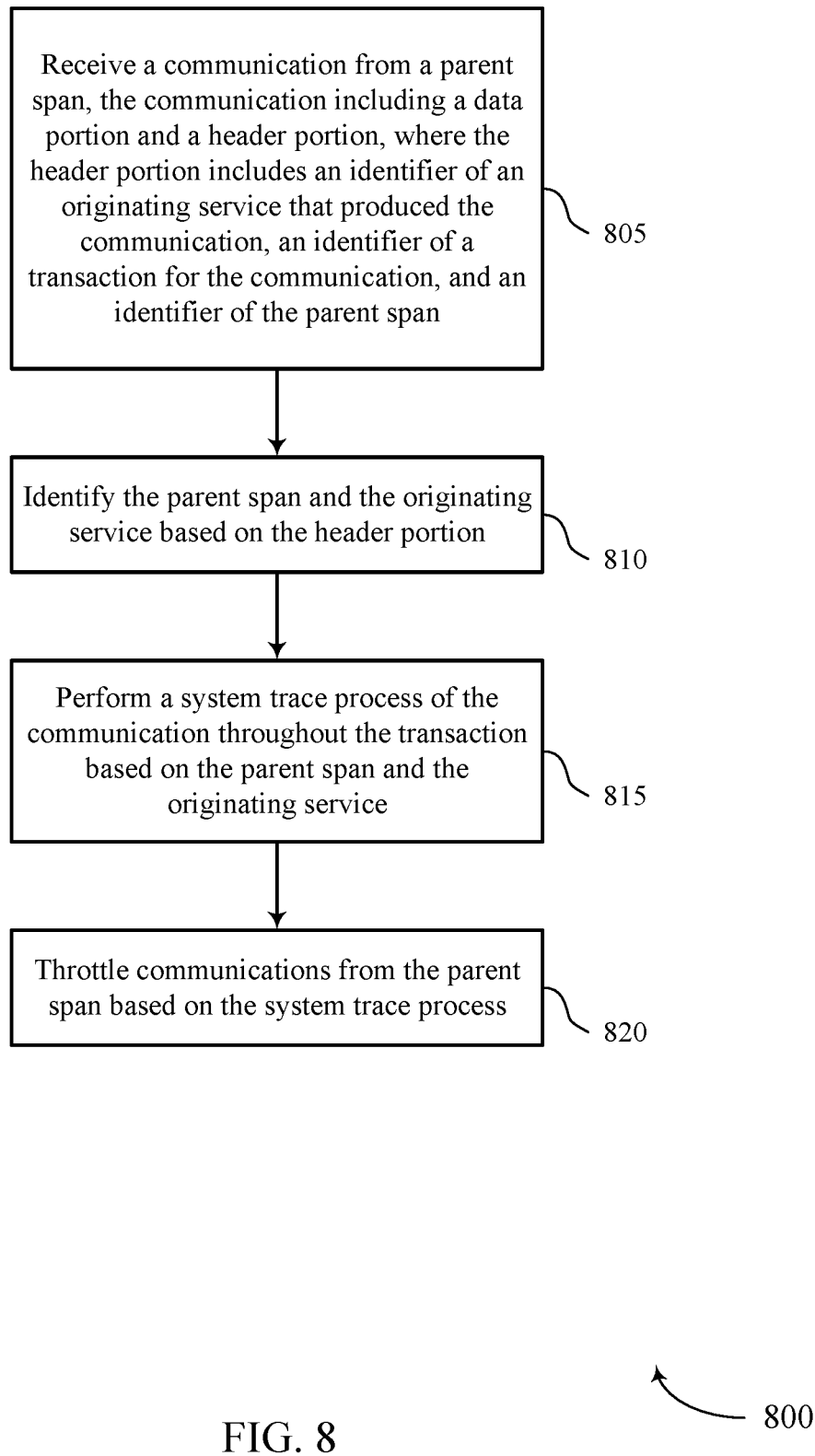

FIG. 8 shows a flowchart illustrating a method 800 for augmenting functionality in distributed systems with payload headers in accordance with various aspects of the present disclosure. The operations of method 800 may be implemented by a data header manager or its components as described herein. For example, the operations of method 800 may be performed by a data header manager 415, 515, or 615 as described with reference to FIGS. 4 through 6. In some examples, a data header manager may execute a set of codes to control the functional elements of the device to perform the functions described below. Additionally or alternatively, the data header manager may perform aspects of the functions described below using special-purpose hardware.

At block 805 the data header manager 415, 515, or 615 may receive a communication from a parent span, the communication comprising a data portion and a header portion, wherein the header portion comprises an identifier of an originating service that produced the communication, an identifier of a transaction for the communication, and an identifier of the parent span. The operations of block 805 may be performed according to the methods described with reference to FIGS. 1 through 3. In certain examples, aspects of the operations of block 805 may be performed by a header identification component as described with reference to FIGS. 4 through 6.

At block 810 the data header manager 415, 515, or 615 may identify the parent span and the originating service based at least in part on the header portion. The operations of block 810 may be performed according to the methods described with reference to FIGS. 1 through 3. In certain examples, aspects of the operations of block 810 may be performed by a span identification component as described with reference to FIGS. 4 through 6.

At block 815 the data header manager 415, 515, or 615 may perform a system trace process of the communication throughout the transaction based at least in part on the parent span and the originating service. The operations of block 815 may be performed according to the methods described with reference to FIGS. 1 through 3. In certain examples, aspects of the operations of block 815 may be performed by a tracing component as described with reference to FIGS. 4 through 6.

At block 820 the data header manager 415, 515, or 615 may throttle communications from the parent span based at least in part on the system trace process. The operations of block 820 may be performed according to the methods described with reference to FIGS. 1 through 3. In certain examples, aspects of the operations of block 820 may be performed by a throttling component as described with reference to FIGS. 4 through 6.

Figure 9:
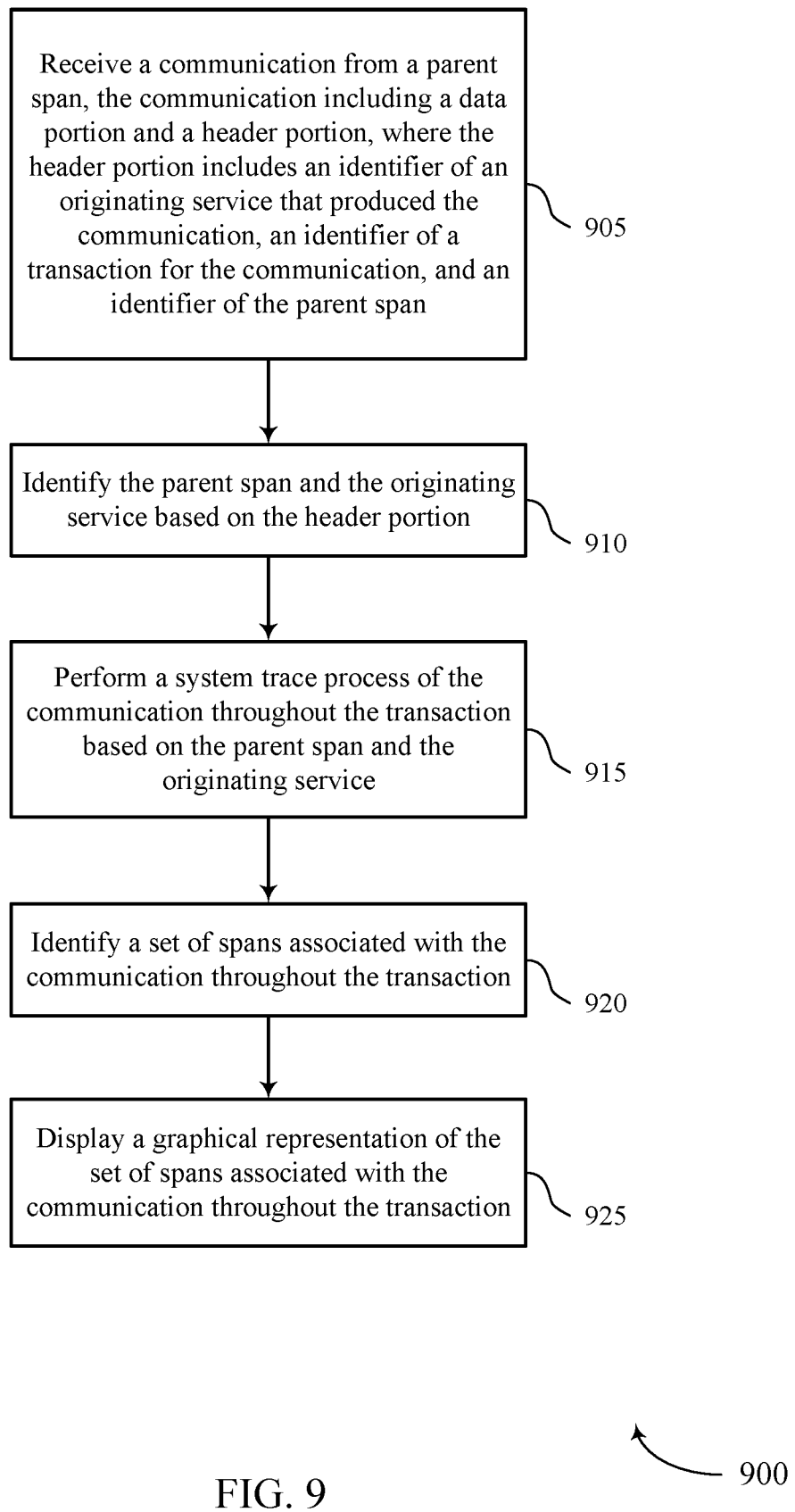

FIG. 9 shows a flowchart illustrating a method 900 for augmenting functionality in distributed systems with payload headers in accordance with various aspects of the present disclosure. The operations of method 900 may be implemented by a data header manager or its components as described herein. For example, the operations of method 900 may be performed by a data header manager 415, 515, or 615 as described with reference to FIGS. 4 through 6. In some examples, a data header manager may execute a set of codes to control the functional elements of the device to perform the functions described below. Additionally or alternatively, the data header manager may perform aspects of the functions described below using special-purpose hardware.

At block 905 the data header manager 415, 515, or 615 may receive a communication from a parent span, the communication comprising a data portion and a header portion, wherein the header portion comprises an identifier of an originating service that produced the communication, an identifier of a transaction for the communication, and an identifier of the parent span. The operations of block 905 may be performed according to the methods described with reference to FIGS. 1 through 3. In certain examples, aspects of the operations of block 905 may be performed by a header identification component as described with reference to FIGS. 4 through 6.

At block 910 the data header manager 415, 515, or 615 may identify the parent span and the originating service based at least in part on the header portion. The operations of block 910 may be performed according to the methods described with reference to FIGS. 1 through 3. In certain examples, aspects of the operations of block 910 may be performed by a span identification component as described with reference to FIGS. 4 through 6.

At block 915 the data header manager 415, 515, or 615 may perform a system trace process of the communication throughout the transaction based at least in part on the parent span and the originating service. The operations of block 915 may be performed according to the methods described with reference to FIGS. 1 through 3. In certain examples, aspects of the operations of block 915 may be performed by a tracing component as described with reference to FIGS. 4 through 6.

At block 920 the data header manager 415, 515, or 615 may identify a plurality of spans associated with the communication throughout the transaction. For example, the system trace process of the communication may include identifying the plurality of spans. The operations of block 920 may be performed according to the methods described with reference to FIGS. 1 through 3. In certain examples, aspects of the operations of block 920 may be performed by a tracing component as described with reference to FIGS. 4 through 6.

At block 925 the data header manager 415, 515, or 615 may display a graphical representation of the plurality of spans associated with the communication throughout the transaction. The operations of block 925 may be performed according to the methods described with reference to FIGS. 1 through 3. In certain examples, aspects of the operations of block 925 may be performed by a tracing component as described with reference to FIGS. 4 through 6.

A method of communication data processing is described. The method may include receiving a communication from a parent span, the communication comprising a data portion and a header portion, wherein the header portion comprises an identifier of an originating service that produced the communication, an identifier of a transaction for the communication, and an identifier of the parent span, identifying the parent span and the originating service based at least in part on the header portion, and performing a system trace process of the communication throughout the transaction based at least in part on the parent span and the originating service.

An apparatus for communication data processing is described. The apparatus may include a processor, memory in electronic communication with the processor, and instructions stored in the memory. The instructions may be operable to cause the processor to receive a communication from a parent span, the communication comprising a data portion and a header portion, wherein the header portion comprises an identifier of an originating service that produced the communication, an identifier of a transaction for the communication, and an identifier of the parent span, identify the parent span and the originating service based at least in part on the header portion, and perform a system trace process of the communication throughout the transaction based at least in part on the parent span and the originating service.

A non-transitory computer readable medium for communication data processing is described. The non-transitory computer-readable medium may include instructions operable to cause a processor to receive a communication from a parent span, the communication comprising a data portion and a header portion, wherein the header portion comprises an identifier of an originating service that produced the communication, an identifier of a transaction for the communication, and an identifier of the parent span, identify the parent span and the originating service based at least in part on the header portion, and perform a system trace process of the communication throughout the transaction based at least in part on the parent span and the originating service.

Some examples of the method, apparatus, and non-transitory computer-readable medium described above may further include processes, features, means, or instructions for throttling communications from the parent span based at least in part on the system trace process.

In some examples of the method, apparatus, and non-transitory computer-readable medium described above, performing the system trace process comprises identifying a plurality of spans associated with the communication throughout the transaction.

Some examples of the method, apparatus, and non-transitory computer-readable medium described above may further include processes, features, means, or instructions for displaying a graphical representation of the plurality of spans associated with the communication throughout the transaction.

In some examples of the method, apparatus, and non-transitory computer-readable medium described above, performing the system trace process comprises identifying a temporal relationship between the communication and the plurality of spans associated with the communication throughout the transaction.

In some examples of the method, apparatus, and non-transitory computer-readable medium described above, the header portion further comprises a sampling header, wherein the sampling header indicates whether to perform the system trace process.

In some examples of the method, apparatus, and non-transitory computer-readable medium described above, the header portion further comprises one or more tags.

In some examples of the method, apparatus, and non-transitory computer-readable medium described above, performing the system trace process may be based at least in part on the one or more tags.

Some examples of the method, apparatus, and non-transitory computer-readable medium described above may further include processes, features, means, or instructions for performing an additional process based at least in part on the one or more tags.

In some examples of the method, apparatus, and non-transitory computer-readable medium described above, the header portion further comprises an identifier of an owner of the communication, information corresponding to the owner, a data policy of the communication, or a combination thereof.

Some examples of the method, apparatus, and non-transitory computer-readable medium described above may further include processes, features, means, or instructions for identifying a modification to the communication by a user other than the owner of the communication. Some examples of the method, apparatus, and non-transitory computer-readable medium described above may further include processes, features, means, or instructions for flagging the communication with an indication that the modification was by a user other than the owner of the communication.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for communication data processing, comprising:
   receiving, at a first span, a communication from a parent span, the communication comprising a data portion and a header portion, wherein the header portion comprises an identifier of an originating service that produced the communication, an identifier of a transaction for the communication, and an identifier of the parent span;
   identifying, at the first span, the parent span and the originating service based at least in part on the header portion, wherein the parent span immediately precedes the first span;
   unwrapping the header portion to process the data portion at the first span;
   modifying, at the first span, the header portion to identify the first span as a parent span for a second span subsequent to the first span in the transaction for the communication;
   wrapping the data portion that was previously wrapped with the header portion with the modified header portion, the modified header portion including an identification of the first span as the parent span for the second span;
   performing a system trace process of the communication throughout the transaction based at least in part on the parent span and the originating service;
   identifying, through the system trace process, that the originating service is transmitting an amount of data that is above a threshold; and
   throttling communications from the originating service based at least in part on the system trace process, wherein throttling comprises limiting a number of communications received from the originating service for a predetermined amount of time.

2. The method of claim 1, further comprising:
   throttling communications from the parent span based at least in part on the system trace process, wherein throttling the communications from the parent span comprises limiting a number of communications received from the parent span for an additional predetermined amount of time.

3. The method of claim 1, wherein performing the system trace process comprises identifying a plurality of spans associated with the communication throughout the transaction.

4. The method of claim 3, further comprising:
   displaying a graphical representation of the plurality of spans associated with the communication throughout the transaction.

5. The method of claim 3, wherein performing the system trace process comprises identifying a temporal relationship between the communication and the plurality of spans associated with the communication throughout the transaction.

6. The method of claim 1, wherein the header portion further comprises a sampling header, wherein the sampling header indicates whether to perform the system trace process.

7. The method of claim 1, wherein the header portion further comprises one or more tags.

8. The method of claim 7, wherein performing the system trace process is based at least in part on the one or more tags.

9. The method of claim 7, further comprising:
   performing an additional process based at least in part on the one or more tags.

10. The method of claim 1, wherein the header portion further comprises an identifier of an owner of the communication, information corresponding to the owner, a data policy of the communication, or a combination thereof.

11. The method of claim 10, further comprising:
    identifying a modification to the communication by a user other than the owner of the communication; and
    flagging the communication with an indication that the modification was by the user other than the owner of the communication.

12. An apparatus for communication data processing, in a system comprising:
    a processor;
    memory in electronic communication with the processor; and
    instructions stored in the memory and operable, when executed by the processor, to cause the apparatus to:
    receive, at a first span, a communication from a parent span, the communication comprising a data portion and a header portion, wherein the header portion comprises an identifier of an originating service that produced the communication, an identifier of a transaction for the communication, and an identifier of the parent span;
    identify, at the first span, the parent span and the originating service based at least in part on the header portion, wherein the parent span immediately precedes the first span;
    unwrap the header portion to process the data portion at the first span;
    modify, at the first span, the header portion to identify the first span as a parent span for a second span subsequent to the first span in the transaction for the communication;
    wrap the data portion that was previously wrapped with the header portion with the modified header portion, the modified header portion including an identification of the first span as the parent span for the second span;
    perform a system trace process of the communication throughout the transaction based at least in part on the parent span and the originating service;
    identify, through the system trace process, that the originating service is transmitting an amount of data that is above a threshold; and
    throttle communications from the originating service based at least in part on the system trace process, wherein the instructions to throttle the communications are executable by the processor to limit a number of communications received from the originating service for a predetermined amount of time.

13. The apparatus of claim 12, wherein the instructions are further executable by the processor to:
    throttle communications from the parent span based at least in part on the system trace process, wherein the instructions to throttle the communications from the parents span are executable by the processor to limit a number of communications received from the parent span for an additional predetermined amount of time.

14. The apparatus of claim 12, wherein performing the system trace process comprises identifying a plurality of spans associated with the communication throughout the transaction.

15. The apparatus of claim 14, wherein the instructions are further executable by the processor to:
display a graphical representation of the plurality of spans associated with the communication throughout the transaction.

16. The apparatus of claim 14, wherein performing the system trace process comprises identifying a temporal relationship between the communication and the plurality of spans associated with the communication throughout the transaction.

17. A non-transitory computer readable medium storing code for communication data processing, the code comprising instructions executable by a processor to:
receive, at a first span, a communication from a parent span, the communication comprising a data portion and a header portion, wherein the header portion comprises an identifier of an originating service that produced the communication, an identifier of a transaction for the communication, and an identifier of the parent span;
identify, at the first span, the parent span and the originating service based at least in part on the header portion, wherein the parent span immediately precedes the first span;
unwrap the header portion to process the data portion at the first span;
modify, at the first span, the header portion to identify the first span as a parent span for a second span subsequent to the first span in the transaction for the communication;
wrap the data portion that was previously wrapped with the header portion with the modified header portion, the modified header portion including an identification of the first span as the parent span for the second span;
perform a system trace process of the communication throughout the transaction based at least in part on the parent span and the originating service;
identify, through the system trace process, that the originating service is transmitting an amount of data that is above a threshold; and
throttle communications from the originating service based at least in part on the system trace process, wherein the instructions to throttle the communications are executable by the processor to limit a number of communications received from the originating service for an additional predetermined amount of time.

18. The non-transitory computer-readable medium of claim 17, wherein the instructions are further executable by the processor to:
throttle communications from the parent span based at least in part on the system trace process, wherein throttling comprises limiting a number of communications received from the parent span for a predetermined amount of time.

19. The non-transitory computer-readable medium of claim 17, wherein performing the system trace process comprises identifying a plurality of spans associated with the communication throughout the transaction.

20. The non-transitory computer-readable medium of claim 19, wherein the instructions are further executable by the processor to:
display a graphical representation of the plurality of spans associated with the communication throughout the transaction.

* * * * *